(12) United States Patent
Reynolds et al.

(10) Patent No.: US 10,988,060 B2
(45) Date of Patent: Apr. 27, 2021

(54) PNEUMATIC SEAT SUPPORT

(71) Applicant: ErgoAir, Inc, Las Vegas, NV (US)

(72) Inventors: Douglas D. Reynolds, Las Vegas, NV (US); Michael A. Schwob, Las Vegas, NV (US)

(73) Assignee: Ergoair, Inc., Las Vegas, NV (US)

( * ) Notice: Subject to any disclaimer, the term of this patent is extended or adjusted under 35 U.S.C. 154(b) by 0 days.

(21) Appl. No.: 16/233,186

(22) Filed: Dec. 27, 2018

(65) Prior Publication Data

US 2019/0193607 A1 Jun. 27, 2019

Related U.S. Application Data

(60) Provisional application No. 62/610,849, filed on Dec. 27, 2017.

(51) Int. Cl.
| | |
|---|---|
| *B60N 2/42* | (2006.01) |
| *B60N 2/38* | (2006.01) |
| *B60N 2/52* | (2006.01) |
| *B60N 2/50* | (2006.01) |

(52) U.S. Cl.
CPC ............ *B60N 2/4242* (2013.01); *B60N 2/38* (2013.01); *B60N 2/502* (2013.01); *B60N 2/505* (2013.01); *B60N 2/509* (2013.01); *B60N 2/522* (2013.01); *B60N 2/525* (2013.01)

(58) Field of Classification Search
CPC .......... B60N 2/38; B60N 2/502; B60N 2/505; B60N 2/509; B60N 2/522; B60N 2/525; B60N 2/527; B60N 2/544; B60N 2/4242; B60G 11/27; B60G 15/12; B60G 17/052; B60G 17/0521; B60G 17/0525; B60G 2202/152; B60G 2202/412; B60G 2206/424; B60G 2400/252; B60G 2500/30; B60G 2800/914; F16F 9/218; F16F 9/0254; F16F 9/49; F16F 9/088; F16F 9/096; F16F 9/0472; Y10S 60/907
USPC ................ 267/131, 120, 64.21, 64.23, 64.24
See application file for complete search history.

(56) References Cited

U.S. PATENT DOCUMENTS

| | | | | |
|---|---|---|---|---|
| 1,988,342 A | * | 1/1935 | Slutz ..................... | B60N 2/522 267/34 |
| 2,272,344 A | * | 2/1942 | Kimbro .................. | B60N 2/527 267/120 |
| 2,880,782 A | * | 4/1959 | Conner .................. | B60N 2/509 248/631 |

(Continued)

*Primary Examiner* — Robert A. Siconolfi
*Assistant Examiner* — San M Aung
(74) *Attorney, Agent, or Firm* — Jeffrey D. Shewchuk; Shewchuk IP Services, LLC (57) ABSTRACT

A pneumatic seat support by itself supports a seat above a floor of a vehicle. The pneumatic seat support has upper and lower air chambers. The lower air chamber is a rigid cylindrical tube. The upper air chamber is a flexible cylindrical bellows, with a diameter greater than the diameter of the tube. Three or more linear shafts extending through the upper air chamber and into the lower air chamber provide a single-degree-of-freedom bearing support structure that allows vertical motion of the seat but withstands horizontal loads on the seat. When the seat moves vertically downward, it compresses air in both chambers, providing a seat support system with a natural oscillation frequency which is less than 2.4 Hz, and preferably in the range of 1.5-2.2 Hz.

20 Claims, 6 Drawing Sheets

(56) References Cited

U.S. PATENT DOCUMENTS

| | | | | |
|---|---|---|---|---|
| 3,193,239 A | * | 7/1965 | Monroe | B60N 2/525 248/566 |
| 3,288,454 A | * | 11/1966 | Decker | B60N 2/502 267/120 |
| 3,459,395 A | * | 8/1969 | Scotto | F16F 13/00 248/573 |
| 4,105,195 A | * | 8/1978 | Lamberts | B60N 2/501 267/120 |
| 4,213,594 A | | 7/1980 | Pietsch et al. | |
| 5,272,633 A | | 12/1993 | Pietsch | |
| 5,294,085 A | * | 3/1994 | Lloyd | B60N 2/501 248/429 |
| 5,735,509 A | | 4/1998 | Gryp et al. | |
| 5,758,859 A | | 6/1998 | Gonzalez | |
| 6,402,128 B1 | * | 6/2002 | Trowbridge | B60G 11/28 267/64.11 |
| 8,075,056 B2 | | 12/2011 | Glockl | |
| 8,757,600 B2 | | 6/2014 | Haller | |
| 8,783,772 B2 | | 7/2014 | Schuler et al. | |
| 9,120,410 B2 | | 9/2015 | Bauman | |
| 9,150,122 B2 | | 10/2015 | Reichel | |
| 9,707,874 B2 | | 7/2017 | Bauman | |
| 2009/0314919 A1 | | 12/2009 | Toffolo | |
| 2012/0007293 A1 | | 1/2012 | Bauer et al. | |
| 2013/0153320 A1 | | 6/2013 | Contratto et al. | |
| 2013/0158791 A1 | | 6/2013 | Contratto et al. | |
| 2014/0131542 A1 | | 5/2014 | Hodnefield | |
| 2014/0217657 A1 | | 8/2014 | Paul | |
| 2014/0263933 A1 | | 9/2014 | Bauman | |
| 2015/0130146 A1 | * | 5/2015 | Moulik | B60G 15/12 280/6.157 |
| 2015/0158404 A1 | | 6/2015 | Pylypenko et al. | |
| 2015/0183493 A1 | | 7/2015 | Zwaan | |
| 2015/0283928 A1 | | 10/2015 | Bauman | |
| 2016/0082870 A1 | | 3/2016 | Fujita et al. | |
| 2016/0096458 A1 | | 4/2016 | Parker et al. | |
| 2016/0176326 A1 | | 6/2016 | Catton et al. | |
| 2016/0355238 A1 | | 12/2016 | Charleston | |
| 2017/0182917 A1 | | 1/2017 | Taylor et al. | |
| 2017/0166100 A1 | | 6/2017 | Lorey et al. | |
| 2017/0182856 A1 | | 6/2017 | Kolb et al. | |
| 2017/0197532 A1 | | 7/2017 | Zwaan | |
| 2017/0283012 A1 | | 10/2017 | Bauman | |

* cited by examiner

PNEUMATIC SEAT SUPPORT

CROSS-REFERENCE TO RELATED APPLICATION(S)

The present application claims the benefit of U.S. provisional patent application Ser. No. 62/610,849, filed Dec. 27, 2017. The contents of U.S. provisional patent application Ser. No. 62/610,849 are hereby incorporated by reference in entirety.

BACKGROUND OF THE INVENTION

The present invention relates to support systems used in vehicle seating, particularly for use in high vibration or high shock travels. Situations exist where vehicle operators and occupants are exposed to high levels of whole body vibration and shock that, at a minimum, can be uncomfortable and, in extreme cases, can cause serious bodily injuries. Vehicles in which vehicle operators and occupants are exposed to potentially injurious whole body vibration and shock include, but are not limited to, land based vehicles that travel on rough roads, on rugged off-road terrain, and on rough above and underground mining surfaces. They also include marine boats and crafts that operate in rough fresh water conditions and in rough ocean sea states.

Injuries experienced in these situations are often associated with exposure to a single extremely high level shock event or with exposure to repeated low and moderate level vibration and shock events over an extended period of time. Vehicle operators and occupants who have sustained previous back or other related injuries from other causes may be more sensitive or intolerant to even moderate levels of whole body vibration and shock exposure from land based vehicles and marine boats and crafts.

Passive, semi-active and active vibration and shock seat isolation systems have been developed and used in land based vehicles and marine boats and crafts. While these seat systems reduce the level of vibration and shock exposure to the seat occupant, they have limitations. Such limitations include, but are not limited to:

A. Many current vibration and shock seat isolation systems require the use of an external mechanical linkage mechanism to prevent or limit the horizontal movement and to direct the vertical movement of the moving components of the seat system. The external linkage mechanism can be exposed to environmental elements that over time can decrease its flexibility and movement and can cause it to lock up. The linkage mechanism typically adds significant weight to the seat system and requires significant vertical and horizontal space around the vibration and shock isolation components of the seat system.

B. Some current vibration and shock seat isolation systems have unduly limited vertical travel. They can bottom out and encounter hard stops at the top of their travel when big bumps and/or high waves are encountered. When the hard stop is reached, the resulting shocks to the body of the seat occupant are often many times greater than the shocks the seat systems were designed to reduce.

C. Semi-active and active vibration and shock seat isolation systems are often more complicated and expensive than passive systems and require increased maintenance to function properly.

D. Passive vibration and shock seat isolation systems that use linear coil springs require long displacements to effectively mitigate high level shocks. There is often insufficient vertical space to accommodate these displacements. Further, coil springs that accommodate these displacements are heavy.

E. Some current pneumatic vibration and shock seat isolation systems use single air chamber rolling lobe air springs. The lowest resonance frequency of these seat systems is around 2.4 Hz.

Vibration and shock seat isolation systems should be lower in cost, have lower system resonance frequencies, and still effectively prevent injuries to the seat occupants. Better solutions are needed.

BRIEF SUMMARY OF THE INVENTION

The present invention is a pneumatic seat support for use in supporting a seat and seat occupant in a vehicle while preventing exposure of the seat to high vibration and shock amplitudes. The pneumatic seat support has upper and lower air chambers, with at least one of the compressible gas chambers having a variable height with a volume that changes with the upward and downward motion of the seat and seat occupant supported by the pneumatic seat support. A single-degree-of-freedom (generally vertical) load-bearing support structure allows vertical motion of the seat but withstands horizontal loads on the seat. When the seat moves vertically downward, it compresses air in the chambers. In one aspect, the single-degree-of-freedom load bearing support structure includes three or more vertically extending linear shafts laterally spaced relative to the seat. In another aspect, the pneumatic seat support provides the sole support for the seat and seat occupant, with three or more linear shafts arranged within a bellows and rigid tube of the seat support structure. In yet another aspect, the seat support system provides a natural frequency of oscillation that extends below 2.4 Hz, such as down to 1 Hz.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

FIGS. 1-4 show a basic embodiment of a pneumatic seat support 10 in accordance with the present invention. The pneumatic seat support 10 includes at least one, and more preferably two vertically arranged fluid filled chambers 12, 14. The fluid in both chambers 12, 14 is most commonly air, and this specification will refer to them as "air chambers" for simplicity sake, but any other compressible gas could alternatively be used, and the "air chamber" terminology is not to be viewed as limiting the compressible gas to only air. As will be explained, one of the air chambers 12 has a solid peripheral wall which rigidly maintains its height and volume, while the other air chamber 14 has a wall structure which can change its height and thereby change its volume. In the preferred embodiments, the fixed height chamber 12 is on the bottom and the variable height chamber 14 is on the top, but the structure 10 could easily be inverted (i.e., used upside down) to provide many of the same benefits.

Figure 1:
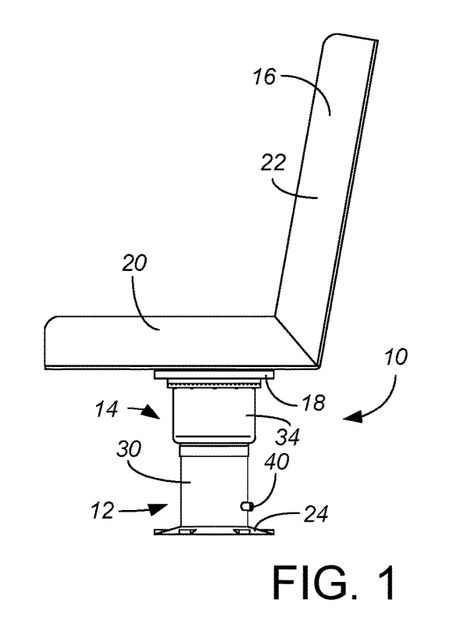
FIG. 1 is a side view of a seat for use in a vehicle, incorporating a preferred embodiment of a pneumatic seat support in accordance with the present invention.
Figure 2:
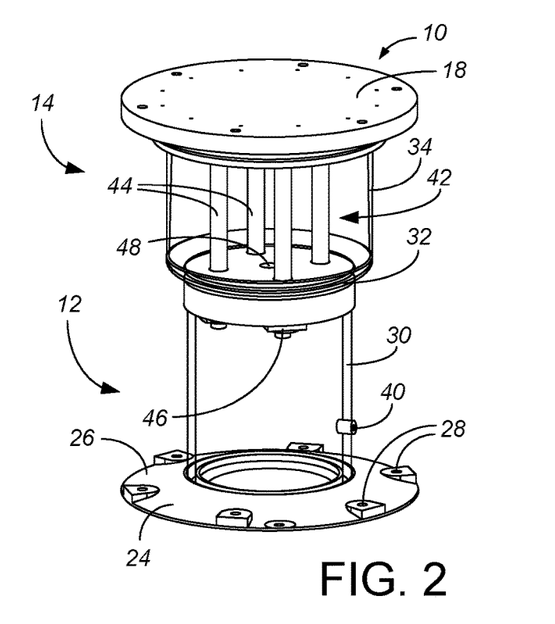
FIG. 2 is a perspective view of the pneumatic seat support of FIG. 1, with the side wall of the bellows 34 and the side wall of the rigid tube 30 shown transparent so the inner construction can be seen.

As shown in FIG. 1, the structure 10 supports a seat 16 for an occupant (not shown), secured to a load bearing plate 18. The seat 16 can include a seat bottom 20 and a seat back 22. While the preferred embodiments all include a load bearing plate 18 as their top, the structure 10 could alternatively attach directly into a portion of the seat bottom 20 without using a plate. The support structure 10 must fit within the footprint of the seat bottom 20 between the seat bottom 20 and the floor (not shown) while permitting from 1 to 8 inches of vertical movement of the seat bottom 20. To fit properly within this space, the unloaded height of the pneumatic seat support 10 is typically 8 to 14 inches. To fit adequately within the footprint of the seat bottom 20, the pneumatic seat support 10 is typically less than about 260 square inches in horizontal cross-section.

The lower air chamber 12 includes a rigid base 24, which allows the seat support 10 to be attached to a vehicle floor. The vehicle could be a land based vehicle or a marine craft. Usually the weight of the seat bottom 20 and load bearing plate 18 will be less than the weight of the occupant, and for most uses the weight of the occupant will be in the range of 100 to 320 pounds, so the pneumatic seat support 10 is designed to carry about 180 to 400 pounds or more from the vehicle floor. For instance, in the preferred embodiment, the base 24 includes one or more flanges 26 that extend outwardly, and the flanges 26 can include bolt holes 28 for bolting the lower air chamber 12 to the vehicle floor. In the preferred embodiments, an impermeable rigid tube 30 extends upward from the base 24, with a cap 32 on the upper end of the rigid tube 30. The base 24, rigid tube 30 and cap 32 are joined together to form the impermeable air tight structure of the lower air chamber 12 with a fixed height that can retain air under pressure. The fixed height chamber 12 thus has its horizontal cross-sectional area defined by the inside of the tube 30. In the preferred embodiment, the tube 30 is cylindrical for ease of manufacturability and strength, at a diameter within the range of 2 to 8 inches. By having the fixed height chamber 12 on the bottom as defined by the rigid tube 30, the structure 10 is rugged and can be repeatedly kicked or subjected to similar abuse without damage. It can also withstand large horizontal forces.

In contrast to the fixed height of the lower air chamber 12, the upper air chamber 14 has a variable height. While this variable height could be formed with a telescoping tube having an airtight sliding seal, the preferred embodiment includes a bellows 34 formed of a flexible, air impermeable material. In the preferred embodiment, the material of the bellows 34 does not stretch under the air pressures of use, so the volume of the upper chamber 14 is solely a function of its height. The bellows 34 extends upward from the cap 32 to the load bearing plate 18. The lower end of the bellows 34 is sealed to the upper surface of the cap 32, such as by a lower ring clamp 36. The upper end of the bellows 34 is sealed to the lower surface of the load bearing plate 18, such as with an upper ring clamp 38. In the preferred embodiment, the bellows 34 is cylindrical to generally match the shape of the tube 30, providing a pleasing aesthetic appearance and easily assembled structure using the clamp rings 36, 38. The cap 32 of the lower air chamber 12, the bellows 34, and the load bearing plate 18 define the impermeable air tight structure of the upper air chamber 14 that retains air under pressure, but which has a height that can change. The horizontal cross-sectional size of the upper air chamber 14 determines the area for the air pressure to act in supporting the seat 16, supporting the 180-400 lb. load. To keep the air pressure within a reasonably low gauge value, the upper air chamber 14 should have a horizontal cross-sectional area of at least about 10 square inches, and more preferably has a horizontal cross-sectional area within the range of about 12 to 51 square inches. When the bellows 34 is cylindrical, this means an inner diameter of about 4 to 8 inches. If desired, both the upper air chamber 14 and the lower air chamber 12 can be sealed with an unchangeable gauge pressure to support the weight of the load bearing plate 18, seat 16 and occupant. More preferably, the system includes a port 40 (shown in FIG. 2) to enable the quantify of air within the system to be changed, and in particular so some air can be added in situations where the seat 16 will support a larger, heavier occupant and so some air can be removed in situations where the seat 16 will support a smaller, lighter occupant. Air can be supplied via a hand pump (not shown), vehicle air supply (not shown) or other air source.

Figure 3:
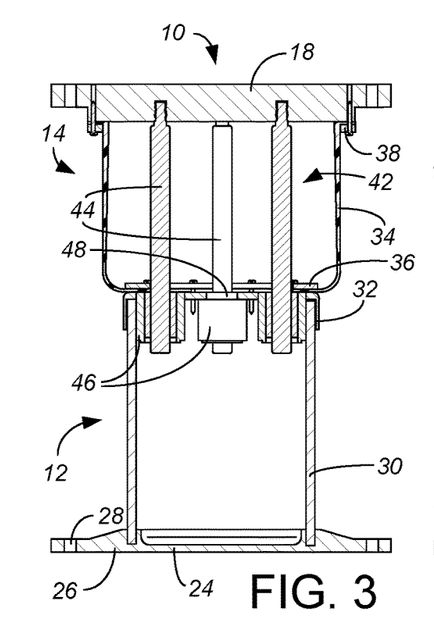
FIG. 3 is a cross-sectional view of the pneumatic seat support of FIGS. 1 and 2, taken through its central axis and through two of the four linear shafts of the preferred embodiment.
Figure 4:
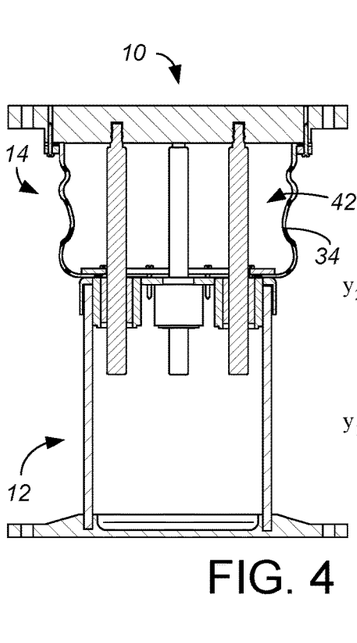
FIG. 4 is a cross-sectional view similar to FIG. 3, but showing the seat support with the support deflected downwardly as when under a load from the seat.

As best shown by comparing FIGS. 3 and 4, the bellows 34 allows compression of the upper air chamber 14, and the height of the upper air chamber 14 must be sufficient to allow such compression under the pressures of use. In the preferred embodiment, the bellows 34 has an uncompressed height within the range of about 5 to 8 inches.

The seat support 10 must be able to provide a generally stable support for the seat 16, and in particular should be able to maintain the generally horizontal orientation of the seat bottom 20 parallel to the vehicle floor, without permitting the seat 16 to move horizontally relative to the vehicle floor, but instead permitting only vertical motion of the seat 16 relative to the vehicle floor. Accordingly, a load bearing structure 42 is provided which generally restricts or prevents horizontal or angular movement of the seat 16 and the load bearing plate 18 to maintain the seat bottom 20 level. When using a bellows 34, the bellows 34 will not resist any horizontal force nor maintain level alignment, so the single degree of freedom load bearing structure 42 is separate from the bellows 34. At the same time, the load bearing structure 42 should be robust, positioned against damage (such as from being kicked or from contamination from dirt, fresh or sea water, or any other contaminants), and should not present potential pinch points to hands, fingers or feet of the seat occupant. To meet these objectives, the single degree of freedom bearing structure 42 is preferably disposed within the bellows 34 and the tube 30. A primary purpose of separating the air volume into a variable volume chamber 14 and a fixed volume chamber 12 is to provide the cap 32 at an appropriate height to secure the single-degree-of-freedom load bearing structure 42.

The preferred load bearing structure 42 includes at least three laterally-spaced linear shafts 44 which are slidably received in corresponding bushing collars 46. By having at least three linear shafts 44, the shafts 44 can be separated (similar to legs on a stool) to support the surface of the seat 16 against moments/leaning in any direction in response to horizontal accelerations acting on the seat structure 10 and occupant. The multiple shafts 44 are spaced at least one inch apart, and more preferably two inches or more apart so they can collectively counteract such moments. In the preferred embodiments, each of the multiple shafts 44 are attached to the load bearing plate 18 extending downwardly therefrom. Each shaft 44 is received in a sliding bushing 46, with each sliding bushing 46 secured to the cap 32. To increase the separation between the linear shafts 44 as much as possible, the preferred embodiment positions the sliding bushings 46 in abutting contact with the inside diameter of the tube 30. One alternative to using the cap 32 is to attached the sliding bushings 46 directly to the tube 30. The air pressure within the air chambers 12, 14 provides the primary upward force on the load bearing plate 18 and the seat 16.

The bottom ends of the linear shafts 44 move within the lower air chamber 12, and the lower air chamber 12 must have a sufficient height to accommodate the stroke of this motion. If the bushings 46 are placed under the cap 32, the height of the bushings 46 must also be accommodated within the lower chamber 12. In the preferred embodiments, the tube 30 has a height within a range of about 4 to 8 inches.

The cap 32 preferably includes an opening 48 that allows airflow between the lower and upper air chambers 12, 14, so the air pressure within the lower air chamber 12 is maintained equal to the air pressure within the upper air chamber 14 with the connected lower and upper air chambers 12, 14 forming a pressurized air compartment. The shafts 44 preferably terminate with their lower end within the lower air chamber 12. The force pushing upward is substantially identical to the horizontal cross-sectional area of the flexible bellows 34 multiplied by the air pressure within the upper and lower air chambers 12, 14. As another alternative, the opening 48 could be made much smaller to function as a nozzle dampening movement of the load bearing plate 18 by restricting the rate of air flow between the upper and lower chambers 12, 14.

Collectively, the shafts 44 need to have sufficient stiffness and strength to resist the horizontal forces that are placed on the seat 16. In practice, when formed out of steel, this means the three shafts 44 should each be about 0.375 inches in diameter or thicker. By using the shafts 44 as structural elements that can withstand the horizontal loads on the seat 16, support and guide members (not shown) for the seat outside the tube 30 and the bellows 34 can be eliminated. Alternatively, additional structure (not shown) can be provided, outside the tube 30 and bellows 34, to ensure that the single-degree-of-freedom support for the seat 16 is adequate.

Other than the material of the bellows 34, the remaining components can be formed of various rigid materials, fabricated using such methods as standard metallic casting, machining and 3D printing operations. One preferred material for the base 24, tube 30, cap 32 and load bearing plate 18 is aluminum. The linear shafts 44 can be formed of stainless steel or brass, and the bushings 46 can optionally include ball bearings. While the bellows 34 can be formed of various flexible, air-tight materials which will not significantly stretch under the air pressures of use, preferred materials for the bellows 34 include Nitril rubber, natural rubber, Chloroprene neoprene rubber, silicone rubber and other materials with similar flexibility and air-tight properties.

The lateral motion of the load bearing plate 18 and flexible bellows 34 is thus constrained by, and the vertical motion of the load bearing plate 18 is thus directed by, the sliding motion of the linear bushing shafts 44 within the linear bushings 46. Placing the linear shafts 44 and the linear bushings 46 inside the lower and upper air chambers 12, 14 protects them from contamination from dust, fresh and salt water, and other related environmental contaminants.

The lower and upper air chambers 12, 14 form an air spring that supports the weight of the seat occupant and seat 16 attached to the upper surface of the load bearing plate 18. The value of the air pressure (referred to as gauge pressure) in the lower and upper air chambers 12, 14 must be sufficient to support the weight of the seat 16 and seat occupant supported by the load bearing plate 18. Deflection of the load bearing plate 18 changes the pressure in the lower and upper air chambers 12, 14. The change in pressure $P_2$ (lb$_f$/in.$^2$) is given by:

$$P_2 = P_1 \frac{Vol_1}{Vol_2} \quad (1)$$

where:
$P_1$=initial pressure (lb$_f$/in.$^2$) in the lower and upper air chambers 12, 14 associated with the undeflected load bearing plate 18;

Vol$_1$=combined air volume (in.$^3$) of the lower and upper air chambers 12, 14 associated with the undeflected load bearing plate 18; and Vol$_2$=combined air volume (in.$^3$) of the lower and upper air chambers 12, 14 associated with the deflected load bearing plate 18.

The changing air pressure P$_2$ associated with the load bearing plate 18 deflection D will push the seat 16 and seat occupant back to their undeflected position.

Figure 5:
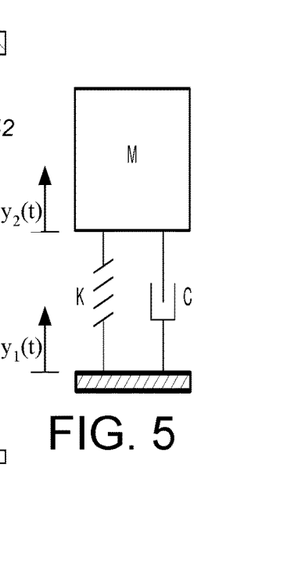
FIG. 5 is a schematic diagram for modeling the response of the pneumatic seat support of the present invention.

The air spring along with the mass of the seat 16 and seat occupant constitute a one-degree-of-freedom vibration system, with FIG. 5 showing a schematic representation of this system. In the one-degree-of-freedom vibration system when used in a vehicle, note that the primary input to the person seated is the movement of the vehicle floor as the vehicle encounters bumps, waves or other obstacles. M represents the combined mass of the seat 16 and seat occupant, together with the load bearing plate 18. K represents the stiffness of the air spring. The value for K (lb$_f$/in.) is given by:

$$K = \frac{\gamma P_a A^2}{Vol} \quad (2)$$

where:

γ=ratio of specific heats, also referred to as the adiabatic index (γ=1.4 for air);

A=cross section area (in.$^2$) of the bellows 34;

Vol=the combined volumes (in.$^3$) of the lower and upper air chambers 12, 14; and P$_a$=absolute pressure (lb$_f$/in.$^2$) of the air in the lower and upper air chambers 12, 14.

Note that both volume and pressure will change as a function of time as the load bearing plate 18 changes its vertical position relative to the floor.

At sea level, P$_a$=14.7+P$_g$ where P$_g$ is the gauge pressure (lb$_f$/in.$^2$) of the air in the lower and upper air chambers 12, 14. The steady state value of the gauge pressure P$_g$ will self-adjust so that P$_g$×A equals the steady state weight of the seat 16 and seat occupant supported by the load bearing plate 18 when the seat is in an undeflected position. C in FIG. 5 represents damping that is present in the system, which in the embodiment of FIGS. 1-4 is negligibly close to zero. Thus, giving an example using a 6 inch inner diameter bellows, with a 200 lb occupant using a seat 16 and load bearing plate 18 with a combined weight of 40 lb, steady state P$_g$ would be about 8.5 lb$_f$/in.$^2$. If, in this example, the combined volumes for the lower and upper air chambers are 250 in.$^3$, the steady state stiffness K would be about 104 lb$_f$/in.

The steady state value for air spring stiffness K is thus set by the selected values for P$_a$, A and Vol associated with the upper and lower air chambers 12, 14. The value for mass M is set by the weight of the seat 16 and seat occupant supported by the load bearing plate 18. The value for the pneumatic seat support air spring stiffness K increases as a function of A$^2$. When the lower and upper air chambers 12, 14 contain only air, the increase in K is slightly nonlinear as the load bearing plate 18 deflects downward.

When C equals zero, the resonance frequency f$_n$ (Hz) of the air spring-pneumatic seat system is given by:

$$f_n = \frac{1}{2\pi}\sqrt{\frac{K}{M}} \quad (3)$$

where:

K=air spring stiffness (lb$_f$/in.)

M=mass (lb$_f$-sec.$^2$/in.) of the seat 16 and seat occupant supported by the load bearing plate 18.

f$_n$ is the frequency at which the air spring-pneumatic seat system will naturally oscillate at when it is excited by an initial displacement or velocity.

The actual value for f$_n$ depends on the weight of the seat 16 and seat occupant supported by the load bearing plate 18 and the related values for P$_a$, A and Vol. For single chamber rolling lobe seat vibration and shock isolation seats of the prior art, the lowest achievable value for f$_n$ is around 2.4 Hz. Continuing with the above example (6 in. dia. bellows, 240 lb. seat/plate/occupant, 250 in.$^3$ volume), one preferred system would have a natural oscillation frequency of about 2 Hz. Increasing the air volume of the system, without changing the diameter of the bellows 34, results in lowering the natural oscillation frequency, while decreasing the air volume of the system, without changing the diameter of the bellows 34, results in raising the natural oscillation frequency. The value for f$_n$ can be reduced to between 1 and 1.5 Hz and possibly lower by increasing the value for Vol, all while staying within the footprint under the seat bottom 20. It will thus be understood that, if a target weight of the occupant is known, the system designer can control the natural oscillation frequency (within reason) by selecting an appropriate size for the tube 30. The present invention involves resonance frequencies of 2.4 Hz or less, and more preferably a resonance frequency between 1.0 and 2.4 Hz, and most preferably a resonance frequency within a range of 1.5-2.2 Hz.

With respect to the human response to vibration and shock, the vehicle seat system shown in FIG. 5 commonly provides two types of inputs. The first is when y$_1$(t) contains frequencies over a frequency range of 1-80 Hz, as the floor of the vehicle moves when the vehicle impacts minor obstacles, such as when riding over gravel or rutted roads or boating over choppy waves. This is the frequency response range of the human body to vertical whole body vibration. The second is when y$_1$(t) is a single vertical shock pulse with a pulse duration of T and a peak acceleration amplitude of A$_P$, such as when the vehicle slams down after airborne travel (possibly over a large wave and into a next wave) or otherwise impacts a major obstacle.

The vertical response Y$_2$/Y$_1$ over the frequency range of 1-80 Hz is given by the equation:

$$\frac{Y_2}{Y_1} = \frac{\sqrt{1+\left(2\xi\frac{f}{fn}\right)^2}}{\sqrt{\left(1-\left(\frac{f}{fn}\right)^2\right)^2 + \left(2\xi\frac{f}{fn}\right)^2}} \quad (4)$$

where f is the system excitation frequency (Hz), f$_n$ is system resonance frequency given by equation (3), and ξ is the damping ratio of the system.

When acceleration is used to describe Y$_1$ and Y$_2$, A$_2$/A$_1$=Y$_2$/Y$_1$ where A$_1$ and A$_2$ are the acceleration values that correspond to Y$_1$ and Y$_2$.

Figure 6:
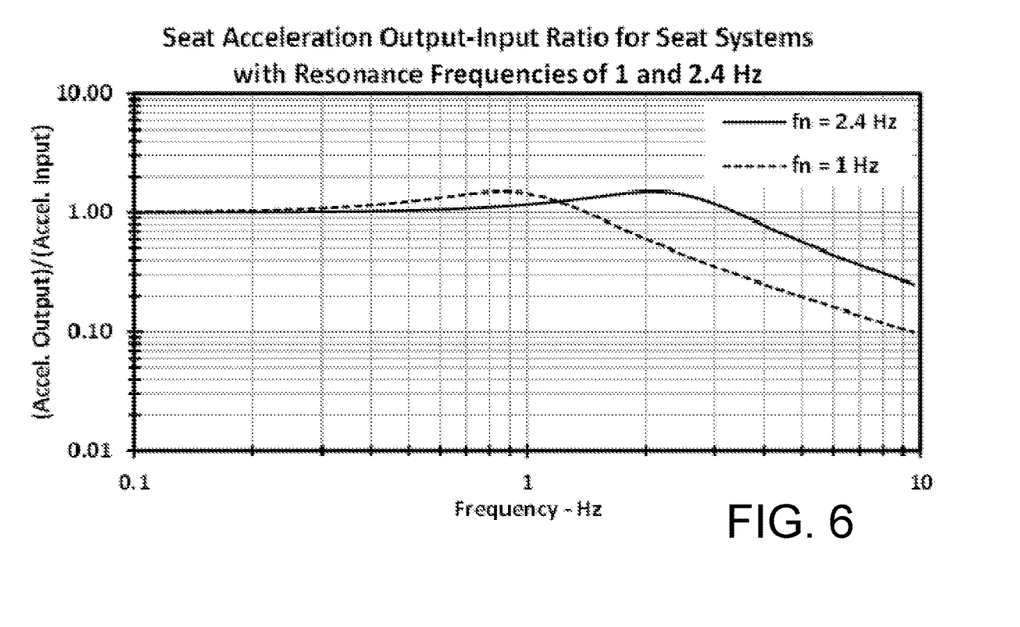
FIG. 6 is a graph showing acceleration output/input ratios as a function of excitation frequency for air spring-pneumatic seats with resonance frequencies of 1 and 2.4 Hz.

FIG. 6 shows acceleration output/input (A$_2$/A$_1$) ratios as a function of excitation frequency f for seats using the pneumatic seat supports 10 of the present invention with a human occupant, for the resonance frequencies of 1 and 2.4

Figure 7:
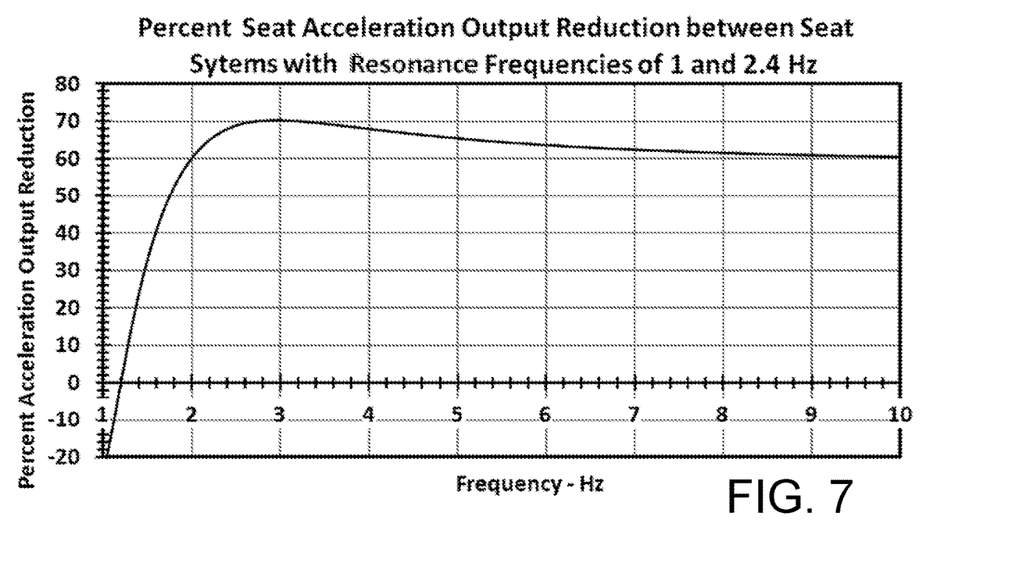
FIG. 7 is a graph showing the percent seat output acceleration reduction when the air spring-pneumatic seat resonance frequency $f_n$ is reduced from 2.4 to 1 Hz.

Hz. When the seat 16 and seat support 10 with occupant is exposed to repetitive shocks or broad band vibration with frequencies of 1-80 Hz, the inventive system behaves as a $2^{nd}$ order low pass mechanical filter that increasingly attenuates frequencies above $1.414f_n$. FIG. 7 shows the percent $A_2/A_1$ reduction when the system resonance frequency $f_n$ is reduced from 2.4 to 1 Hz (i.e., most easily controlled by increasing the size of the tube 30). FIGS. 6 and 7 demonstrate that having a higher air volume within the system is important particularly for vehicles encountering repetitive shocks or broad band vibration with frequencies over about 1.5 Hz.

When the seat system shown in FIG. 5 is exposed to a single vertical shock input, the ratio $A_2/A_1=Y_2/Y_1$ is given by the equation:

$$\frac{A_2}{A_1} = \frac{Y_2}{Y_1} = \pi \frac{T}{T_n} \quad (5)$$

when the shock pulse is described as a triangular or versesine shock pulse with an amplitude of $A_P$. T is the shock pulse duration (ms) and $T_n$ is the period of oscillation (s) associated with equation (3). $T_n$ is given by the equation:

$$T_n = \frac{1}{f_n}. \quad (6)$$

$A_2$ is given by the equation:

$$A_2 = A_1 \pi \frac{T}{T_n}. \quad (7)$$

$A_2$ can be reduced by increasing $T_n$ (achieved by decreasing of $f_n$).

Figure 8:
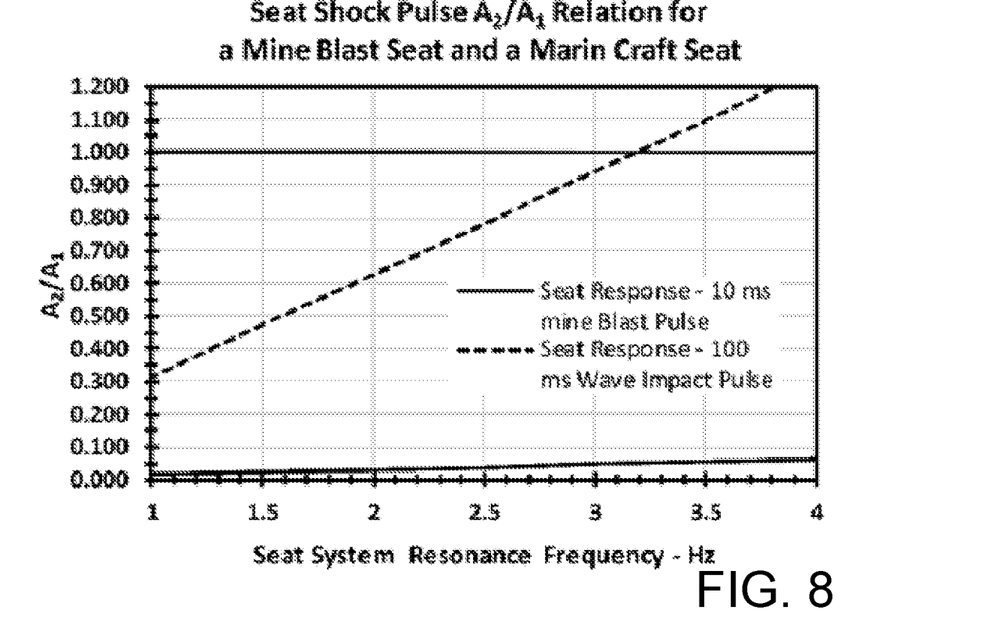
FIG. 8 is a graph showing acceleration output/input ratios as a function of the resonance frequency $f_n$ of the preferred pneumatic seat support when exposed to a 10 ms mine blast shock and a 100 ms wave impact shock.

FIG. 8 shows the shock response $A_2/A_1$ for the seat system in FIG. 5 as a function of resonance frequency $f_n$ when exposed to a 10 ms mine blast pulse and a 100 ms wave impact pulse.

Figure 9:
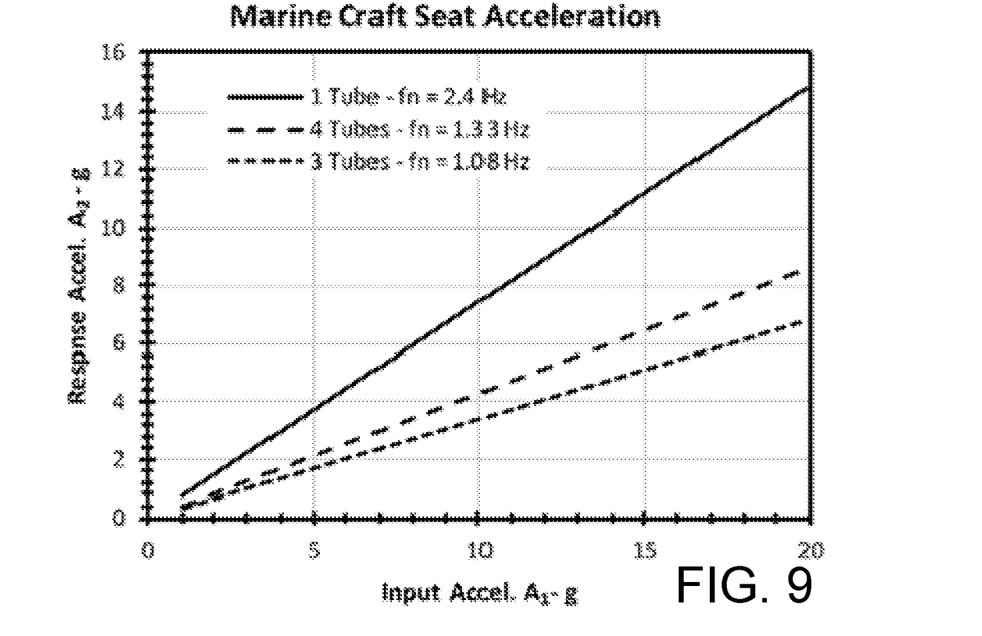
FIG. 9 is a graph showing acceleration response $A_2$ as a function of acceleration input $A_1$ for seat system resonance frequencies of 2.4 Hz, 1.33 Hz and 1.08 Hz.

FIG. 9 shows the value of $A_2$ as a function of $A_1$ for values of $f_n$=2.4 Hz, $f_n$=1.33 Hz and $f_n$=1.08 Hz. These reductions in $f_n$ from 2.4 Hz to 1.33 Hz and 1.08 Hz are achieved by increasing the total volume of air in the system relative to the area within the bellows 34.

The peak displacement $D_2$ associated with the peak acceleration input amplitude $A_1=A_P$ is given by the equation:

$$D_2 = \frac{A_P}{(2\pi f_n)^2} \left[ \pi \frac{T}{T_n} \right]. \quad (8)$$

Figure 10:
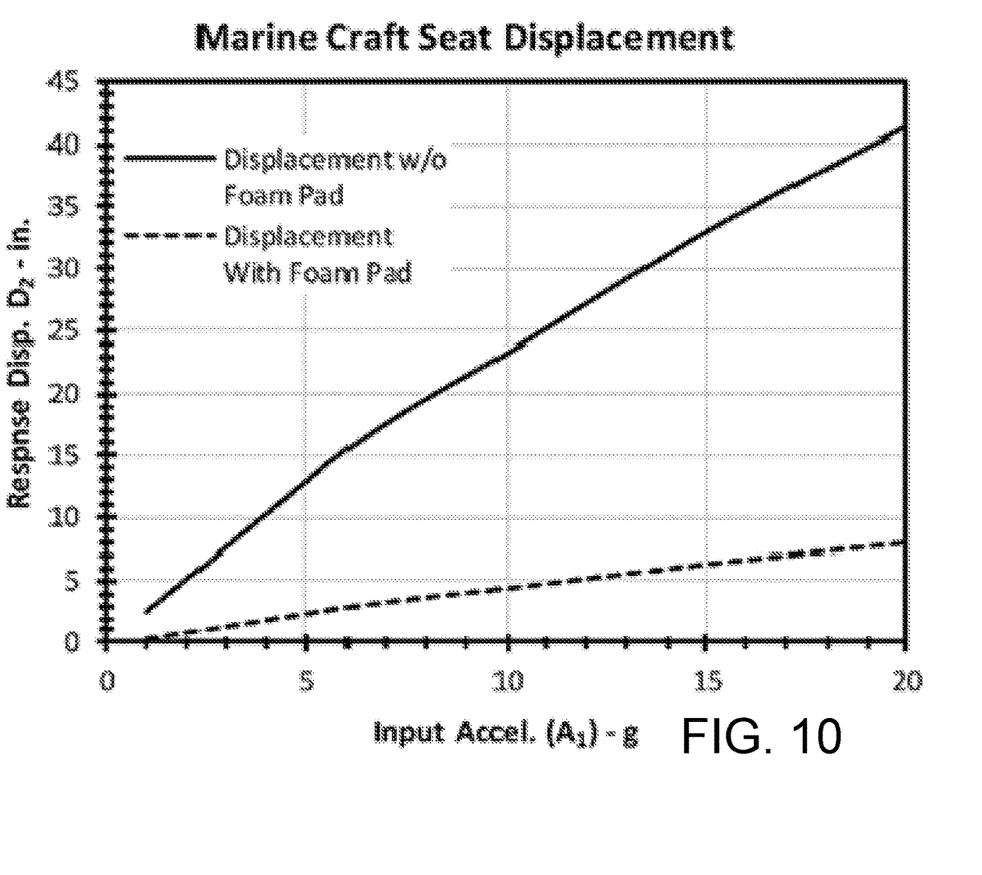
FIG. 10 is a graph showing seat displacement $D_2$ as a function of acceleration input amplitude $A_1$ for the preferred pneumatic seat support when the upper compressible chamber incorporates a compressible foam pad.

Provided that deflection $D_2$ remains less than the height of the upper air chamber 14 FIG. 10 shows the peak displacement $D_2$ associated with a 100 ms wave impact pulse.

The deflection $D_2$ cannot be greater than the height of the upper air chamber 14. If/when the deflection $D_2$ equals the height of the upper air chamber 14, the bottom surface of the load bearing plate 18 comes into contact with the upper surface of the lower ring clamp 36. This is referred to as "bottoming out" and can input a large shock into the seat 16 and seat occupant supported by the load bearing plate 18. The amplitudes of anticipated shock inputs into a seat 16 and seat occupant supported by the load bearing plate 18 for a given vehicle or marine craft application are generally known, so the seat support structure 10 can be designed to avoid "bottoming out".

Figure 11:
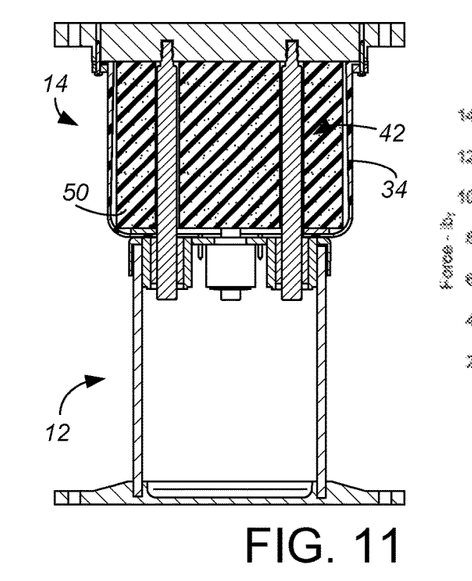
FIG. 11 is a cross-sectional view similar to FIG. 3 of a first alternative embodiment of a pneumatic seat support in accordance with the present invention, in which a compressible open cell foam pad has been added within the bellows.

As noted above, the value for the pneumatic seat support air spring stiffness K is not constant. When the lower and upper air chambers 12, 14 contain only air, the stiffness K increases as the load bearing plate 18 deflects downward. The stiffness K can be more significantly adjusted by placing a pad 50 in the upper air chamber 14 as shown in the embodiment of FIG. 11. When pad 50 is an open cell or similar cellular matrix pad, it insignificantly decreases the volume of air in the system, but significantly adds to the air spring forced resisting downward motion of the load bearing plate 18. While the embodiment of FIG. 11 shows a pad 50 which fills the substantial entirety of the upper chamber 14, an alternative pad (not shown) could occupy only a bottom portion of the upper chamber 14, to only compress upon significant downward deflection of the load bearing plate 18. The pad 50 is preferably formed of an open cell foam or similar cellular matrix, having a density in the range of 2 to 5 lb/ft$^3$. The open cell nature of such materials allows air to freely flow through the pad 50 in the upper air chamber 14, maintaining consistent air pressure inside the seat support 10 at any given time.

Figure 12:
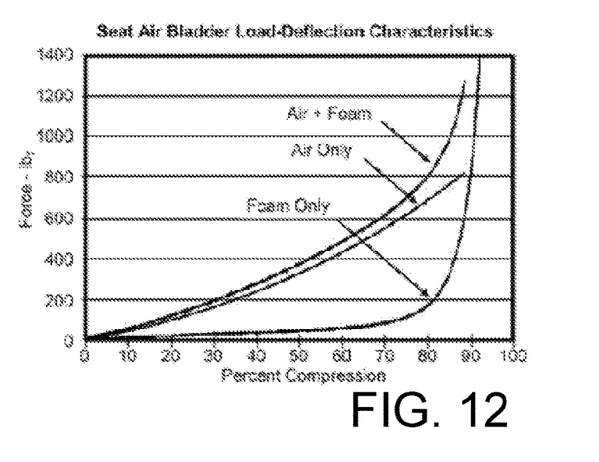
FIG. 12 is a graph showing stiffness comparisons for when the upper compressible chamber is filled with only air, with only compressible foam, and with both air and compressible foam.

FIG. 12 shows the relative changes in stiffness K caused by deflection of the load bearing plate 18 for air alone, for the pad 50 alone, and for the combination of the pad 50 and air in a sealed seat support 10. The upward force of air chambers 12, 14 plus open cell foam pad 50 becomes very large as the downward motion of load bearing plate 18 increases. This causes the air spring plus pad stiffness K to increase nonlinearly at an increasing rate as the pad 50 compresses toward a denser state. Accordingly, the addition of the pad 50 can significantly eliminate the possibility of the seat support 10 "bottoming out" when exposed to very high shock levels.

Figure 13:
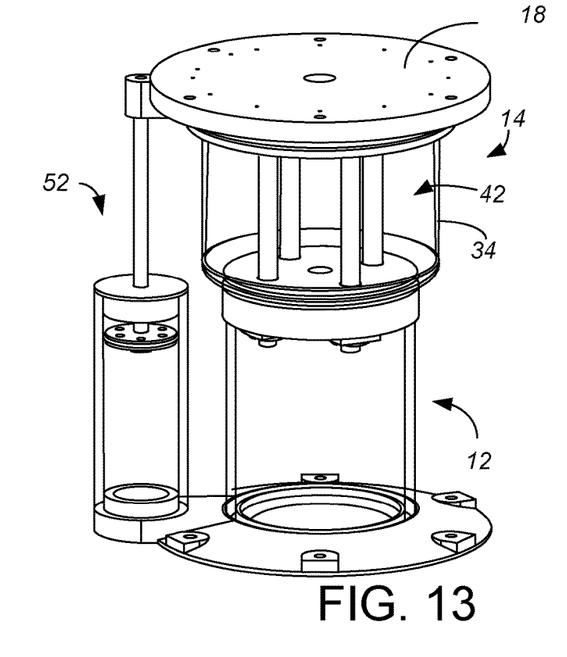
FIG. 13 is a perspective view of a second alternative embodiment of a pneumatic seat support in accordance with the present invention, in which a dashpot damper has been added outside the bellows.
Figure 14:
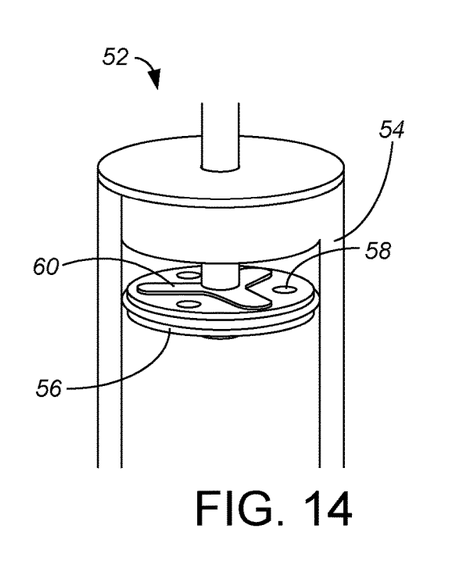
FIG. 14 is an enlargement of a portion of FIG. 13.

FIGS. 13 and 14 depict an embodiment of the invention that includes a viscous damper 52. Viscous damper 52 includes a sealed chamber 54 that contains a viscous fluid and a movable piston 56. For instance, the sealed chamber 54 can be attached at its bottom to the base 24, and the movable piston 56 can be attached at its top to the load bearing plate 18. The movable piston 56 preferably contains a number of fluid restriction ports 58, with preferred embodiments including four to eight ports 58 placed around the circumference of the piston 56. The ports 58 allow viscous fluid to flow back and forth through the face of movable piston 56 as it moves up and down with the movement of load bearing plate 18.

Movable piston 56 can have a flapper valve 60, as best shown in FIG. 14, placed on its upper surface. The flapper valve 60 opens during the downward motion of movable piston 56 permitting viscous fluid to flow through ports 58 and closes during the upward motion of movable piston 56 blocking the flow of viscous fluid through ports 58. This action decreases the viscous damping associated with viscous damper 52 during the downward motion of movable piston 56 and increases the relative viscous damping of viscous damper 52 during the upward motion of movable piston 56.

Figure 15:
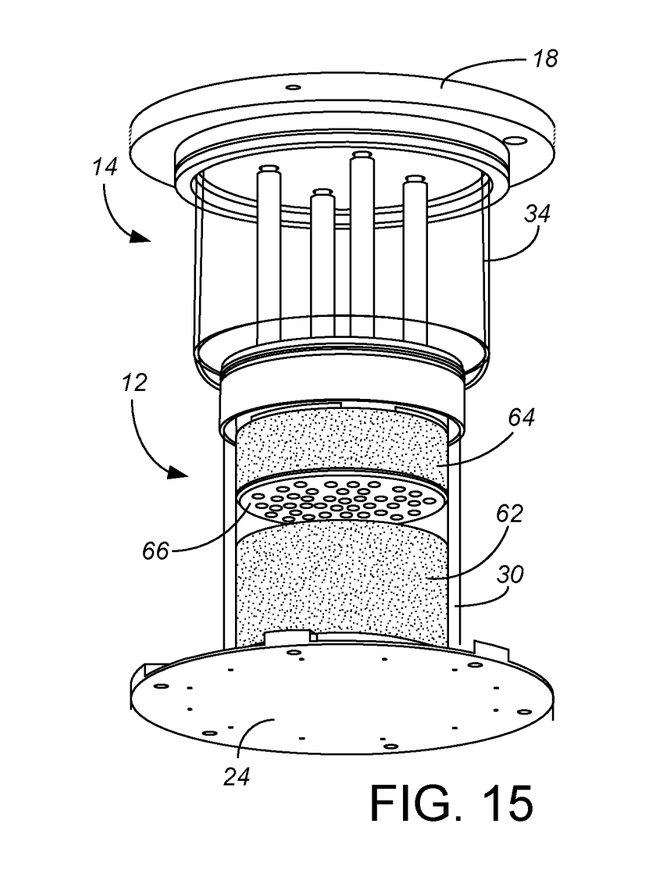
FIG. 15 is a perspective view from below of a third alternative embodiment of a pneumatic seat support in accordance with the present invention, in which compressible foam pads have been added in the lower compressible gas chamber.

FIG. 15 shows an embodiment of the invention in which two pads 62, 64 are used, one pad 62 similar to the pad 50 of FIG. 10 resisting downward motion of the load bearing plate 18 and a second pad 64 resisting upward motion of the load bearing plate 18. In this embodiment, a rigid perforated plate 66 is attached to the bottom ends of linear bearing shafts 44, and both pads 62, 64 are placed within the tube 30, one pad 64 above the plate 66 and one pad 62 below the plate 66. The plate 66 has a central range of free motion where it does not compress either of the pads 62, 64. While the plate 66 is within this central range, changes in air pressure are used as the sole mechanism to influence the vertical deflection of the load bearing plate 18. If a significant downward shock event occurs (i.e., where the vehicle floor is shocked upward relative to the momentum of the seat occupant), the lower pad 62 will be compressed, increasing the stiffness of the system and preventing "bottoming out". If a significant upward shock event occurs (i.e., where the vehicle floor is shocked downward relative to the momentum of the seat occupant, which is rarer in vehicle motion than the "bottoming out" shock event but still possible), the upper pad 64 will be compressed, increasing the stiffness of the system and preventing "topping out".

Figure 16:
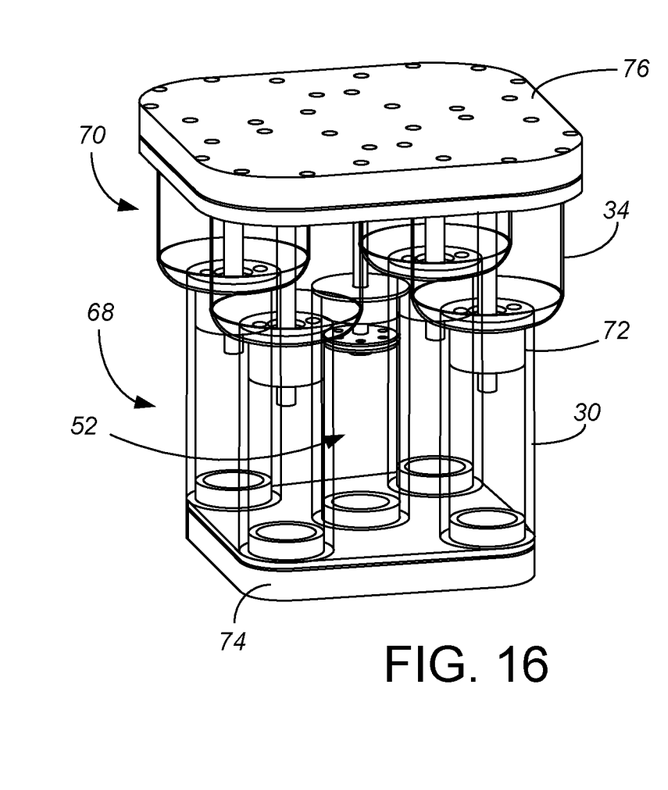
FIG. 16 is a perspective view of a fourth alternative embodiment of a pneumatic seat support in accordance with the present invention, in which the linear bearing shafts have been separated, each into their own individual air chamber which are in fluid communication through a lower air manifold, together with a dashpot damper, showing each as transparent for understanding of the internal structure.

FIG. 16 shows an embodiment of the invention in which the air volumes of lower and upper air chambers 12, 14 are replaced with four equal lower air chambers 68 and four equal upper air chambers 70, which allows greater lateral separation between each of the linear bearing shafts 42. The total air volume of the four lower air chambers 68 is similar to the air volume of lower air chamber 12. The total air volume of the four upper air chambers 70 is similar to the air volume of upper air chamber 14. Cap 32 is replaced by four properly sized caps 72. The functionality and sealing of the upper and lower air chambers 68 and 70, caps 72, and the linear load bearing shafts 42 are the same as their corresponding components in FIGS. 1-4. Base 24 is replaced by base 74. The load bearing plate 76 is supported by the four upper air chambers 70. An alternative embodiment uses three sets of air chambers 68, 70 arranged in a triangle rather than four arranged in a square.

In addition to securing the embodiment to the floor of the vehicle, one preferred embodiment includes passages (not shown) in base 74 to act as an air manifold that allows airflow between the four lower air chambers 68. The air volume in base 74 adds to the air volume Vol of air chambers 68, 70 without increase the area A of upper air chambers 70, thereby lowering the resonance frequency $f_n$ of the system.

Although the present invention has been described with reference to preferred embodiments, workers skilled in the art will recognize that changes may be made in form and detail without departing from the spirit and scope of the invention. For instance, the materials, fabrication processes and system dimensions that are stated above are typical for pneumatic seat supports. Actual materials, fabrication processes and system dimension may vary from those stated above, depending on actual performance requirements for a vibration and shock isolation pneumatic seat support system.

What is claimed is:

1. A pneumatic seat support for use in supporting a seat in a vehicle, comprising:
   a base securable relative to a floor of the vehicle;
   upper and lower compressible gas chambers above the base, at least one of the compressible gas chambers having a variable height with a volume which changes based on elevation of a supported seat in the vehicle;
   a single-degree-of-freedom bearing support structure allowing generally vertical motion of the seat, with the vertical motion compressing gas in the upper and lower compressible gas chambers, the bearing support structure comprising:
   at least three linear shafts laterally spaced relative to the seat, the linear shafts being received in bushings permitting relative motion between the linear shafts and the bushings in only a generally vertical direction, with the interaction between the linear shafts and the bushings supporting and resisting lateral forces on the seat;
   at least one compressible pad within either the upper or lower compressible gas chamber and permitting compressible gas movement through the compressible pad; and
   a plate attached on lower ends of the linear shafts, the plate moving vertically with the supported seat and with the linear shafts relative to the bushings.

2. The pneumatic seat support of claim 1, wherein the lower compressible gas chamber comprises a rigid tube and a cap secured to a top of the rigid tube, the cap having an opening permitting compressible gas communication with the upper compressible gas chamber, such that the lower compressible gas chamber has a constant height and constant volume.

3. The pneumatic seat support of claim 2, wherein the cap supports the bushings for each of the linear shafts, with lower ends of the linear shafts extending through the cap into the lower compressible gas chamber.

4. The pneumatic seat support of claim 3, wherein the bushings abut an inside wall of the rigid tube.

5. The pneumatic seat support of claim 1, wherein the upper compressible gas chamber comprises a bellows with a flexible airtight wall.

6. The pneumatic seat support of claim 5, wherein the lower compressible gas chamber comprises a rigid tube such that the lower compressible gas chamber has a constant height and constant volume, and wherein both the bellows and the tube are cylindrical and coaxially arranged.

7. The pneumatic seat support of claim 6, wherein the bellows has a greater diameter than the tube.

8. The pneumatic seat support of claim 7, wherein the base comprises a flange extending outwardly from the tube, the flange having bolt holes for attachment relative to a floor of the vehicle.

9. The pneumatic seat support of claim 1, wherein each of the linear shafts have a thickness of at least 0.375 inches, to support and resist lateral forces on the seat.

10. The pneumatic seat support of claim 1, wherein each of the linear shafts are laterally separated from the adjacent linear shafts by at least one inch.

11. The pneumatic seat support of claim 1, which, when supporting a seat occupant weighing from 100 to 300 pounds, has a steady state resonant frequency less than 2.4 Hz.

12. The pneumatic seat support of claim 1, wherein the at least one compressible pad is formed of open cell foam.

13. The pneumatic seat support of claim 1, with one compressible pad above the plate and one compressible pad below the plate.

14. A pneumatic seat support for use in supporting a seat in a vehicle, comprising:
   a base securable relative to a floor of the vehicle;
   upper and lower compressible gas chambers above the base, at least one of the compressible gas chambers having a variable height with a volume which changes based on elevation of a supported seat in the vehicle;
   a single-degree-of-freedom bearing support structure allowing generally vertical motion of the seat, with the vertical motion compressing gas in the upper and lower compressible gas chambers, the bearing support structure comprising:
   at least three linear shafts laterally spaced relative to the seat, the linear shafts being received in bushings permitting relative motion between the linear shafts and the bushings in only a generally vertical direction, with the interaction between the linear shafts and the bushings supporting and resisting lateral forces on the seat; and a viscous fluid damper dampening vertical motion of the seat, wherein the viscous fluid damper has a different dampening rate when moving upward than when moving downward.

15. A pneumatic seat support for use in supporting a seat in a vehicle, comprising:

a base securable relative to a floor of the vehicle;

a rigid tube extending upwardly from the base;

a cap on top of the rigid tube, the base, tube and cap jointly defining a lower compressible gas chamber;

at least one bushing secured to the cap;

a bellows with a flexible airtight wall extending upwardly from the cap;

a load bearing plate atop the flexible bellows, the load bearing plate, the bellows and the cap jointly defining an upper compressible gas chamber; and a linear bearing shaft rigidly attached to the load bearing plate and extending downwardly from the load bearing plate, the linear bearing shaft cooperating with the bushing to allow the load bearing plate to move with a single degree of freedom, with the motion compressing gas in the upper and lower compressible gas chambers, wherein the lower end of the linear bearing shaft extends through the bushing into the lower compressible gas chamber, with the lower end being above the base so compressible gas pressure within the lower compressible gas chamber pushes upward on the lower end of the linear bearing shaft.

16. The pneumatic seat support of claim 15, wherein the tube and the bellows are coaxially arranged and cylindrical.

17. The pneumatic seat support of claim 16, wherein the bellows has a greater diameter than the tube.

18. A seat in a vehicle, comprising:

a seat having a seat bottom;

a pneumatic seat support under the seat bottom and providing the sole support for the seat from a floor of the vehicle, the pneumatic seat support comprising:

at least one compressible gas chamber providing a variable height with a volume which changes based on elevation of the supported seat relative to the floor in the vehicle;

a single-degree-of-freedom bearing support structure allowing generally vertical motion of the seat while supporting and resisting lateral forces on the seat, with the vertical motion compressing gas in the compressible gas chamber, with the bearing support structure being within the compressible gas chamber, the bearing support structure comprising:

a plurality of linear shafts laterally spaced relative to the seat, the linear shafts being received in bushings permitting relative motion between the linear shafts and the bushings in only a generally vertical direction, with the interaction between the linear shafts and the bushings supporting and resisting lateral forces on the seat;

a compressible pad within the compressible gas chamber and permitting compressible gas movement through the compressible pad, the compressible pad having an initial state in which the compressible pad extends a full height of the compressible gas chamber so any decrease in volume of the compressible gas chamber causes compression of the at least one compressible pad to resist such decrease in volume.

19. A pneumatic seat support for use in supporting a seat in a vehicle, comprising:

a base securable relative to a floor of the vehicle;

at least two sets of upper and lower compressible gas chambers above the base interconnected to form a single gas spring, at least one of the compressible gas chambers in each set having a variable height with a volume which changes based on elevation of a supported seat in the vehicle; and a single-degree-of-freedom bearing support structure allowing generally vertical motion of the seat, with the vertical motion compressing gas in the two sets of upper and lower compressible gas chambers;

wherein the interconnection between the two sets of upper and lower compressible gas chambers is through passages in the base such that the base serves as a manifold adding to the volume of the upper and lower compressible gas chambers thereby lowering the resonant frequency of the gas spring when used in a pneumatic seat support system.

20. The pneumatic seat support of claim 19, comprising four sets of upper and lower compressible gas chambers interconnected to form a single gas spring.

* * * * *